US009771284B2

(12) United States Patent
Haskins

(10) Patent No.: US 9,771,284 B2
(45) Date of Patent: Sep. 26, 2017

(54) SITU CHEMICAL FIXATON OF METAL CONTAMINANTS

(71) Applicant: Environmental Technology and Investment Corporation, Boca Raton, FL (US)

(72) Inventor: Stan Charles Haskins, Golden, CO (US)

(73) Assignee: ENVIRONMENTAL TECHNOLOGY AND INVESTMENT CORPORATION, Boca Raton, FL (US)

( * ) Notice: Subject to any disclaimer, the term of this patent is extended or adjusted under 35 U.S.C. 154(b) by 398 days.

(21) Appl. No.: 14/144,085

(22) Filed: Dec. 30, 2013

(65) Prior Publication Data

US 2015/0183666 A1 Jul. 2, 2015

(51) Int. Cl.
*B09C 1/08* (2006.01)
*C02F 1/72* (2006.01)
*C02F 1/52* (2006.01)

(52) U.S. Cl.
CPC .............. *C02F 1/5236* (2013.01); *B09C 1/08* (2013.01); *B09C 2101/00* (2013.01); *C02F 1/722* (2013.01)

(58) Field of Classification Search
None
See application file for complete search history.

(56) References Cited

U.S. PATENT DOCUMENTS 4,181,714 A * 1/1980 Misato .................. A01N 63/02 424/115
5,202,033 A * 4/1993 Stanforth .................. B09C 1/08 210/911
7,662,294 B1 * 2/2010 Cox, Jr. .................. A62D 3/38 210/753
2002/0003116 A1 1/2002 Golden
2002/0090697 A1 * 7/2002 Hince .................... B09C 1/002 435/187
2011/0198071 A1 8/2011 Swearingen et al.

(Continued)

FOREIGN PATENT DOCUMENTS

CN 102642951 8/2013

OTHER PUBLICATIONS

Cundy et al. "Use of iron-based technologies in contaminated land and groundwater remdiation: A review" Science of the Total Environment, Aug. 8, 2008, 400, 42-51.*

(Continued)

*Primary Examiner* — Michael H Wilson
*Assistant Examiner* — Katherine Will
(74) *Attorney, Agent, or Firm* — Steven M. Greenberg, Esq.; CRGO Law

(57) ABSTRACT

Embodiments of the invention provide for treating arsenic contaminants in an in situ environment. In accordance with an embodiment of the invention, a stabilized oxidizing agent can be prepared, for instance a stabilized liquid hydrogen peroxide agent, as can an aqueous chelated iron solution. Both the stabilized oxidizing agent and the aqueous chelated iron solution can be alternately introduced into the in situ environment contaminated with arsenic by way of alternate injection screens into the in situ environment so as to remediate the arsenic contamination of the in situ environment.

20 Claims, 1 Drawing Sheet

(56) References Cited

U.S. PATENT DOCUMENTS

2012/0243942 A1* 9/2012 Swearingen ............ B09C 1/002 405/129.25
2015/0021275 A1* 1/2015 Cronk ....................... B09C 1/08 210/741

OTHER PUBLICATIONS

Mohan et al. "Arsenic removal from water/wastewater using adsorbents—A critical review" Journal of Hazardous Materials, 2007, 142, 1-53.*
Kakarla et al. "Modified Fenton's Processes for Effective In-Situ Chemical Oxidation—Laboratory and Field Evaluation" Remediation, 2002, 12, 23-36.*
Artiola, et al., "In Situ Treatment of Arsenic Contaminated Soil . . . ," Waste Management Elsevier, NY, NY, vol. 10, No. 1, Jan. 1990, pp. 73-76.

* cited by examiner

SITU CHEMICAL FIXATON OF METAL CONTAMINANTS

BACKGROUND OF THE INVENTION

Field of the Invention

The present invention relates to in-situ fixation of metal contaminants in soil and/or groundwater.

Description of the Related Art

The treatment of contaminated soils and groundwater is an important aspect of environmental science and particularly, is relevant in respect to uncontrolled hazardous waste disposal sites. The most common methods for site remediation include excavation and landfill disposal. While these methods are known to remove contaminants, both methods are costly and in some cases difficult if not impossible to perform. More recently, research has focused on the conversion of contaminants contained in soil and groundwater based upon the development of on-site and in situ treatment technologies. These technologies focus on the removal of contaminants through physical methods or the in-situ treatment of contaminants utilizing chemical or biological methods.

Physical methods of removing metallic contaminants focus on the utilization of pump and treat technology. Chemical methods of removing metallic contaminants focus on chemical changes of valence states, either reduction or oxidation, so as to convert the metallic contaminants to less harmful or less mobile states. The use of strong reductants have been shown to be effective at converting the valence state of chromium VI, a very mobile and toxic form of chromium, to chromium III, a less mobile and less toxic form.

Arsenic as a metal contaminant demonstrates a more mobile valence state, arsenic III ($As^{+3}$) that migrates freely in groundwater and is particularly toxic. Consequently, in-situ arsenic treatment in soil and groundwater has focused on the binding or the fixing the arsenic to an iron complex that precipitates and either can be filtered from water in an aboveground treatment system, or left to settle within the soil matrix under in-situ conditions. The conventional arsenic treatment process is straight forward within a drinking water treatment facility. Specifically, in a conventional arsenic treatment process, extracted groundwater is mixed with an iron solution and hydrogen peroxide; the peroxide oxidizes $As^{+3}$ to $As^{+5}$, the dissolved oxygen concentration increases due to the addition of the peroxide, iron then forms oxyhydroxide using the dissolved oxygen and the $As^{+5}$ binds to iron-oxyhydroxide. This entire complex is a solid and is then filtered from the groundwater.

The treatment of arsenic by the conventional process is much more difficult outside of a wastewater treatment plant and under in-situ conditions since distribution and mixing of the separate solutions, iron and peroxide, is impractical due to the rapid nature of the reactions and the instability of hydrogen peroxide when in contact with organic material within the soil matrix. Under in-situ conditions, the reactions occur so quickly after injection into the groundwater-saturated soil matrix and the peroxide decomposes to oxygen and water rapidly producing abundant volumes of gas within the soil matrix. It is possible to conduct a treatment program with these methods, however the distribution radius around the injection location is very limited and the injectable volumes are small. These limitations are due to the rapid reaction rates which produce rapid and significant volumes of gas which often cause fluid, groundwater and injected solutions, to surface or daylight soon after injection commences.

BRIEF SUMMARY OF THE INVENTION

Embodiments of the present invention address deficiencies of the art in respect to treating metal contaminants in the ground and provide a novel and non-obvious system and method for treating arsenic contaminants in an in situ environment, for instance soil, groundwater or bedrock. In an embodiment of the invention, a method of treating arsenic contaminants in an in situ environment contaminated with arsenic includes preparing an aqueous chelated iron solution and a stabilized oxidizing agent. The method also includes adding both the aqueous chelated iron solution and the stabilized oxidizing agent to the in situ environment in an amount sufficient to promote the co-precipitation of iron-arsenic oxyhydroxides. In this regard, the solution and agent can be added alternately following and preceding separate water injections into the in situ environment. Thereafter, the arsenic is oxidized from $As^{+3}$ to $As^{+5}$ and the iron is oxidized from $Fe^{+2}$ to $Fe^{+3}$.

In one aspect of the embodiment, the aqueous chelated iron solution includes an effective amount of an iron selected from the group consisting of Fe (II) salts, Fe (III) salts, Fe (II) chelates, Fe (III) chelates and combinations thereof. In another aspect of the embodiment, the stabilized source of the oxidizing agent is a peroxide selected from the group consisting of hydrogen peroxide, sodium peroxide and calcium peroxide. In yet another aspect of the embodiment, the aqueous chelated iron solution is maintained at a pH of from about 5 to 8. In even yet another aspect of the embodiment, the stabilized source of the oxidizing agent is stabilized, for example with a stabilizer selected from the group consisting of an acid, a salt, and a mixture of acid and salt, and as yet additional examples, with a stabilizer selected from the group consisting of phosphoric acid, monopotassium phosphate and a combination of phosphoric acid and monopotassium.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for treating arsenic contaminants in an in situ environment. In accordance with an embodiment of the invention, a stabilized oxidizing agent can be prepared, for instance a stabilized liquid hydrogen peroxide agent, as can an aqueous chelated iron solution. Both the stabilized oxidizing agent and the aqueous chelated iron solution can be alternately introduced through injection screens into the in situ environment so as to oxidize and fix arsenic present in the in situ environment thus remediating the arsenic contamination within the in situ environment.

Figure 1:
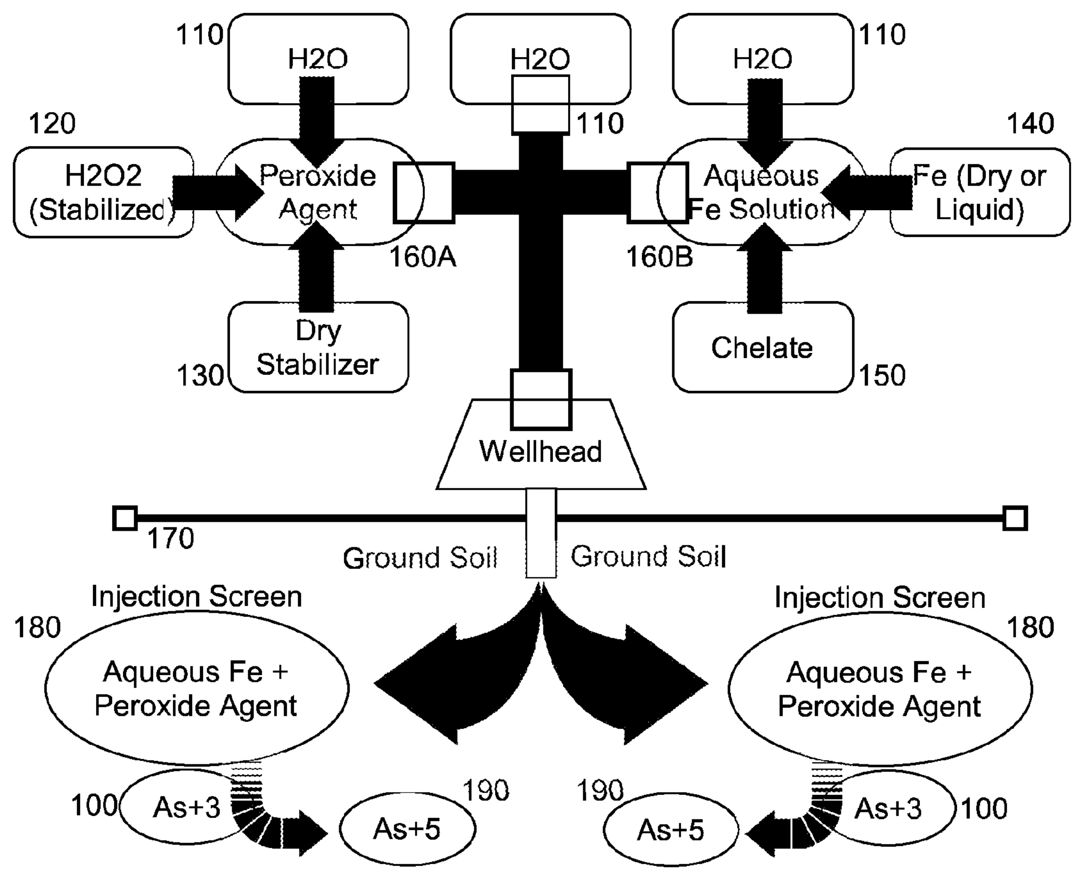
FIG. 1 is a pictorial illustration of a process for treating arsenic contaminants in an in situ environment; and, FIG. 2 is a flow chart illustrating a process for treating arsenic contaminants in an in situ environment.

In further illustration, FIG. 1 pictorially shows a process for treating arsenic contaminants in an in situ environment. As shown in FIG. 1, a peroxide agent 160A can be prepared through the addition of water 110 to a peroxide source 120 and a dry stabilizer 130. Concurrently, an aqueous iron solution 160B can be prepared through the addition of water 110 to dry or liquid iron 140 and chelates 150. Thereafter, each of the water 110, the peroxide agent 160A and the aqueous iron solution 160B can be introduced into an in situ environment 170 by way of injection screening performed, for instance, by direct push injection rods coupled to a wellhead, or an injection well coupled to a wellhead. The injection screen 180 can act to oxidize arsenic +3 100 present in the in situ environment 170 into arsenic +5190 which can be fixed to iron-oxyhydroxide.

Figure 2:
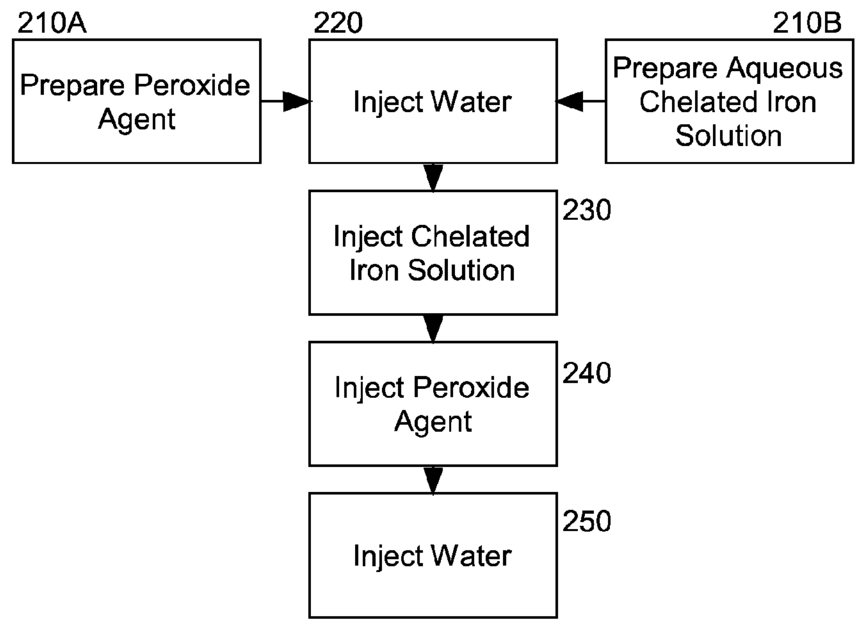

In yet further illustration, FIG. 2 is a flow chart illustrating a process for treating arsenic contaminants in an in situ environment. Beginning in block 210A, a peroxide agent is prepared. The peroxide agent can include, for instance, a peroxide such as hydrogen peroxide, sodium peroxide or calcium peroxide. Also, the source of the peroxide can be stabilized, for instance using a stabilizer such as an acid, a salt, or a mixture of acid and salt. More particularly, the stabilizer can be monopotassium phosphate or a combination of phosphoric acid and monopotassium.

Concurrently, in block 210B an aqueous chelated iron solution is prepared. The aqueous iron solution can include an effective amount of an iron selected from at least one member of the group consisting of Fe (II) salts, Fe (III) salts, Fe (II) chelates, Fe (III) chelates and combinations thereof. The aqueous iron solution can be maintained at a pH of from about 5 to 8 by adding a pH modifying agent to the aqueous iron solution, the modifying agent including by way of example water or chelating agents.

Thereafter, both the peroxide agent and the aqueous iron solution can be added to the in situ environment such as soil, groundwater, or fractured bedrock. In this regard, the in situ environment can be soil or groundwater with moderate to high permeability. Alternatively, the in situ environment can be soil or groundwater with low to moderate permeability. In either case, the peroxide agent can be added into the in situ environment in an effective concentration and in an amount sufficient to promote the co-precipitation of iron-arsenic oxyhydroxides.

In one aspect of the embodiment, the peroxide agent and the aqueous iron solution can be added to the in situ environment utilizing injection screens. Of note, the injection screens can be introduced into the capillary fringe of the in situ environment, the vadose zone of the in situ environment, or the saturated zone. The injection can be performed under elevated pressure from about five to one-hundred pounds per square inch, wherein the peroxide agent and the aqueous iron solution are introduced alternately through a wellhead into the in situ environment following an initial water flush and followed by an additional water flush as shown in blocks 230 through 250. However, it is to be understood that the peroxide agent and the aqueous solution may be introduced in any order into the in situ environment, and in one embodiment of the invention, both can be introduced continuously into the in situ environment.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of treating arsenic contaminants in an in situ environment, comprising the steps of:

preparing an aqueous chelated iron solution;

co-precipitating iron-arsenic oxyhydroxides by both adding a stabilized source of an oxidizing agent, of peroxide in water at a concentration of up to 10% that is stabilized with a stabilizer, to said in situ environment, and also adding said aqueous chelated iron solution to said in situ environment in the presence of said source of the oxidizing agent; and, oxidizing arsenic in the in situ environment and oxidizing iron in the in situ environment.

2. The method of claim 1 wherein the aqueous chelated iron solution comprises an amount of an iron selected from at least one member of the group consisting of Fe (II) chelates, Fe (III) chelates and combinations thereof.

3. The method of claim 1 wherein said stabilized source of the oxidizing agent is a stabilized source of peroxide selected from the group consisting hydrogen peroxide, sodium peroxide and calcium peroxide.

4. The method of claim 1, wherein the stabilized source of the oxidizing agent is stabilized with a stabilizer selected from the group consisting of an acid, a salt, and a mixture of acid and salt.

5. The method of claim 4, wherein the stabilizer is selected from the group consisting of phosphoric acid, monopotassium phosphate and a combination of phosphoric acid and monopotassium.

6. The method of claim 1, further comprising maintaining said aqueous chelated iron solution at a pH of from about 5 to 8 by adding a pH modifying agent to the aqueous iron solution.

7. The method of claim 6, wherein the pH modifying agent is selected from water and chelating agents.

8. The method of claim 1, comprising alternately adding the stabilized source of the oxidizing agent and the aqueous chelated iron solution to the in situ environment.

9. The method of claim 8, wherein the aqueous chelated iron solution is first added to the in situ environment followed by the stabilized source of the oxidizing agent.

10. The method of claim 8, wherein the stabilized source of the oxidizing agent is first added to the in situ environment followed by said aqueous chelated iron solution.

11. The method of claim 1, comprising continuously adding both the stabilized source of the oxidizing agent and also the aqueous chelated iron solution to the in situ environment.

12. The method of claim 1, wherein the in situ environment comprises soils with high permeability.

13. The method of claim 1, wherein the in situ environment comprises soils with low permeability.

14. The method of claim 1, wherein the in situ environment is selected from the group consisting of soil, groundwater, and fractured bedrock.

15. The method of claim 14, wherein the stabilized source of the oxidizing agent and the aqueous chelated iron solution are added to a region within the in situ environment known as the capillary fringe.

16. The method of claim 14, wherein the stabilized source of the oxidizing agent and the aqueous chelated iron solution are added to a region within the in situ environment known as the vadose zone.

17. The method of claim 14, wherein the stabilized source of the oxidizing agent and the chelated aqueous iron solution are added to a region of the in situ environment comprising the saturated zone.

18. The method of claim 14, wherein multiple doses of the source of the oxidizing agent and the aqueous chelated iron solution are added to the in situ environment.

19. The method of claim 1 wherein the source of the oxidizing agent and the aqueous chelated iron solution are added to the in situ environment at an elevated pressure above atmospheric pressure.

20. The method of claim 19 wherein the elevated pressure is from about 5 to 100 psi.

* * * * *